No. 869,969. PATENTED NOV. 5, 1907.
R. E. KIMBLE.
WEIGHING DEVICE.
APPLICATION FILED FEB. 25, 1907.
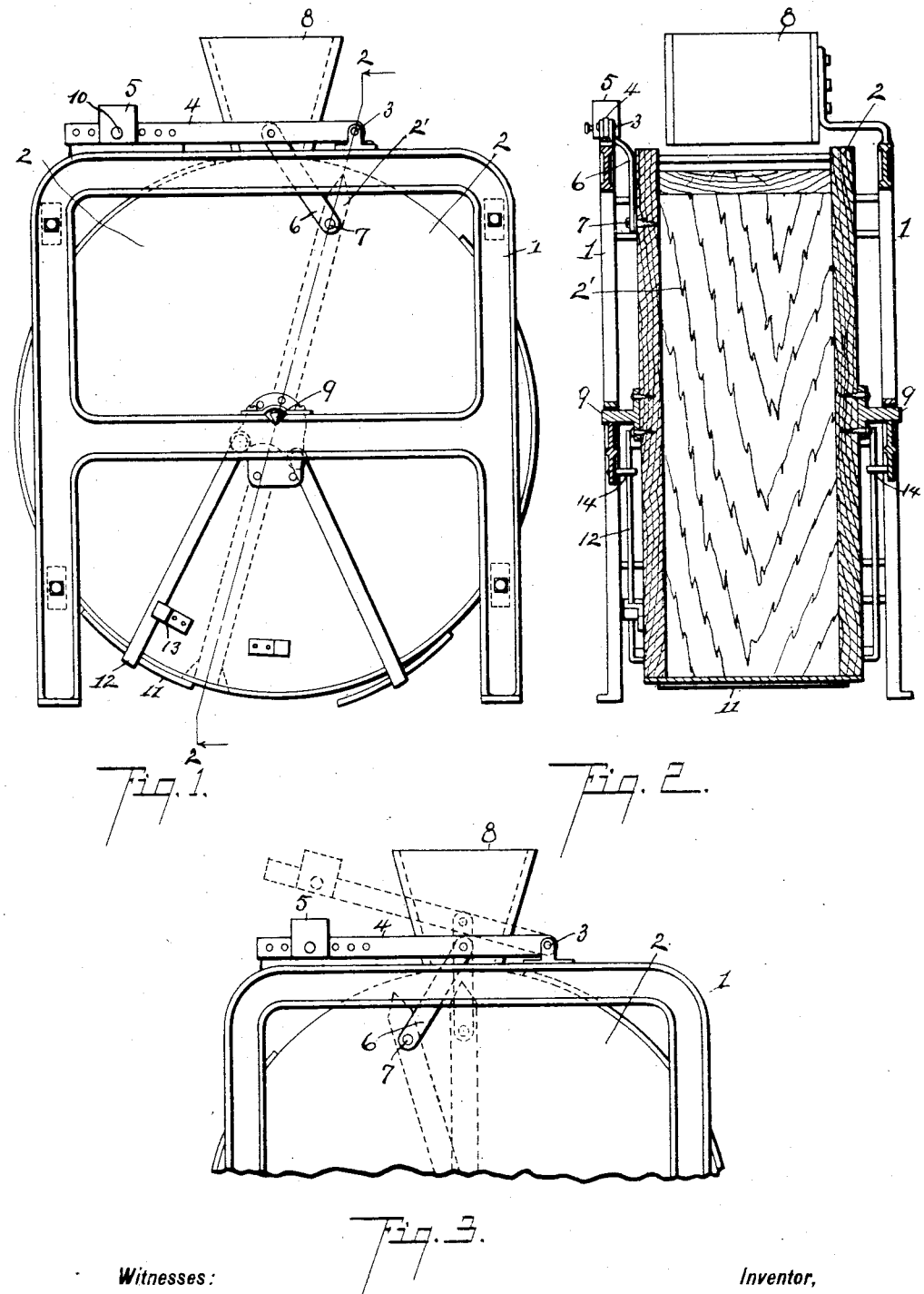
Witnesses:
Inventor,
Ransom E. Kimble
By Chappell & Earl
Att'ys

UNITED STATES PATENT OFFICE.

RANSOM E. KIMBLE, OF VICKSBURG, MICHIGAN.

WEIGHING DEVICE.

No. 869,969.  Specification of Letters Patent.  Patented Nov. 5, 1907.

Application filed February 25, 1907. Serial No. 359,121.

*To all whom it may concern:*

Be it known that I, RANSOM E. KIMBLE, a citizen of the United States, residing at the village of Vicksburg, county of Kalamazoo, and State of Michigan, have invented certain new and useful Improvements in Weighing Devices, of which the following is a specification.

This invention relates to improvements in automatic scales.

The main object of this invention is to provide an improved automatic scale which is very simple in structure and which is at the same time accurate and entirely automatic.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing forming a part of this specification, in which:

Figure 1 is a side elevation of a structure embodying the features of my invention, parts being broken away to better show the structure and the movement of the parts being indicated by dotted lines; Fig. 2 is a sectional view taken on the broken line 2—2 of Fig. 1, the partition 2′ being shown in full lines; and Fig. 3 is a detail side elevation view showing the movement of the scale beam in operation by dotted lines.

In the drawing, similar letters of reference refer to similar parts throughout the several views.

Referring to the drawing: the frame 1 is of any suitable construction. I have here illustrated the same as an independent frame. I will remark, however, that my improved scale is especially designed by me as an automatic grain weighing scale for use in connection with threshing machines and, when so used, the frame is preferably designed to be attached to the threshing machine.

I provide a double compartment weighing box 2 which is preferably formed of a cylindrical receptacle, having a centrally-arranged partition plate 2′ therein. The weighing box is supported to oscillate on centrally arranged pivots 9, the pivots being preferably of the knife-edge type such as are commonly used in scales. The weighing box compartments are provided with discharge openings at the bottom which are closed when the compartments are in their receiving position by doors 11. These doors are supported by links 12 which are pivoted to the scale-box at each side of its supporting pivots. Pins 14 on the frame engage the links on their inward movement to open the doors. The catches 13 engage the links on their outward movement to co-act with the links in closing the doors.

The scale beam 4 is pivoted at 3 and is provided with a suitable adjustable weight 5. This weight is preferably adjustably secured to the scale beam by means of the pin 10 which is adapted to be inserted through suitable holes provided therefor in the scale beam. The scale beam is connected to the weighing box by means of the link 6 which is pivotally secured thereto, so that when the weight of the scale beam is at rest, the weighing box is in position for one or the other of its compartments to receive the material to be weighed from the hopper 8, as clearly appears from the drawing. When the weight of the material in a weighing box is sufficient to overcome the scale weight, the weighing box is oscillated on its pivot, the scale weight being lifted to the position indicated by dotted lines in Fig. 3 during the motion, beyond which point, it assists in oscillating the weighing box. The material is then delivered into the opposite box until the weight therein is sufficient to overcome the weight of the scale beam, when the movement is repeated, the boxes discharging in one position and receiving in the other. From the foregoing, it will be evident that I accomplish this result by a very simple mechanism which is, at the same time, accurate and is entirely automatic.

Having thus described my invention, what I claim as new and desire to secure by Letters Patent, is:

1. In an automatic scale, the combination of a hopper; a double compartment weighing box formed of a receptacle divided by a centrally-arranged partition, and having discharge openings for each compartment; a centrally-arranged pivot on which said weighing box is oscillatingly supported; a scale beam; a weight adjustably secured thereto; a link pivoted to said scale beam and to said weighing box, whereby said weighing box is held in position for said hopper to deliver to one or to the other of its compartments when said scale beam is at rest; doors for said discharge openings; supporting links for said doors, pivoted to said weighing box at each side of its pivot; pins for limiting the inward movement of said links; and catches on said weighing box, adapted to engage said door supporting links as the weighing box oscillates, for the purpose specified.

2. In an automatic scale, the combination of a hopper; a double compartment weighing box formed of a receptacle divided by a centrally-arranged partition, and having discharge openings for each compartment; a centrally arranged pivot on which said weighing box is oscillatingly supported; a scale beam; a weight; a link pivoted to said scale beam and to said weighing box, whereby said weighing box is held in position for said hopper to deliver to one or the other of its compartments when said scale beam is at rest; doors for said discharge openings; supporting links for said doors, pivoted to said weighing box at each side of its pivot; pins for limiting the inward movement of said links; and catches on said weighing box, adapted to engage said door supporting links as the weighing box oscillates, for the purpose specified.

3. In an automatic scale, the combination of a hopper; a double compartment weighing box formed of a receptacle divided by a centrally-arranged partition and having discharge openings for each compartment; a centrally-arranged pivot on which said weighing box is oscillatingly supported; a scale beam; a weight adjustably secured thereto; a link pivoted to said scale beam and to said weighing box, whereby said weighing box is held in position for said hopper to deliver to one or to the other of its compartments when said scale beam is at rest, for the purpose specified.

4. In an automatic scale, the combination of a hopper, a double compartment weighing box formed of a receptacle divided by a centrally-arranged partition and having discharge openings for each compartment; a centrally-arranged pivot on which said weighing box is oscillatingly supported; a scale beam; a weight; a link pivoted to said scale beam and to said weighing box, whereby said weighing box is held in position for said hopper to deliver to one or to the other of its compartments when said scale beam is at rest, for the purpose specified.

In witness whereof, I have hereunto set my hand and seal in the presence of two witnesses.

RANSOM E. KIMBLE. [L. S.]

Witnesses:
A. F. ADAMS,
OTIS A. EARL.